March 24, 1959 D. A. STARR, JR 2,879,340

MAGNETIC TRANSDUCING MEANS

Filed March 11, 1953

INVENTOR
DAVID A. STARR JR.
BY
Laurence R. Brown
ATTORNEY

United States Patent Office 2,879,340

Patented Mar. 24, 1959

2,879,340

MAGNETIC TRANSDUCING MEANS

David A. Starr, Jr., Wenonah, N.J., assignor to Burroughs Corporation, Detroit, Mich., a corporation of Michigan Application March 11, 1953, Serial No. 341,735

7 Claims. (Cl. 179—100.2)

This invention relates generally to magnetic recording systems and reproducing devices and techniques, and more particularly to transducers having single turn transducing windings.

In magnetic recording or reproducing systems it has been difficult to obtain uniformity of transducer characteristics with gap type heads, since leakage flux and transducing flux distribution is not uniform in identically manufactured cores because of manufacturing tolerances. In addition, residual magnetism of a transducer ferromagnetic core is undesirable since it may cause the record surface to be polarized in such a way that recorded signals are changed in amplitude. This effect is particularly pronounced when the transducing means is a gap in the transducer core since the residual leakage flux will be concentrated near the record surface. Therefore toroidal or ring shaped transducer cores have been supplied with a transducing means comprising a single closed loop of conductive material. However, for use in digital computers, the loop of conductive material must be quite fine and uniform to give adequate pulse definition. Since wire may be drawn to a small diameter of consistently uniform dimension, a wire loop is preferred. It thereby becomes a problem to hold the wire in position about the core so that fouling of the magnetic record surface is prevented, and so that a well defined pulse of uniform characteristics is formed.

It is, accordingly, a general object of the present invention to provide recording systems and transducer devices which improve the foregoing inadequacies of the prior art.

Another object of the invention is to provide novel transducer devices having very little leakage flux.

A further object of the invention is to provide transducing devices which lend themselves to uniformity in manufacture.

Further it is an object of the invention to provide transducers which are economical in manufacture.

A still further object of the invention is to provide a transducer having a ferromagnetic core, the residual external flux of which is not concentrated at the transducing portion of the head.

Other objects and features of advantage will be found throughout the following description of the invention.

A transducer is provided in accordance with this invention containing substantially the entire magnetic flux in a closed toroidal type core of ferromagnetic material. Thus, a transformer is provided having transducing means closely wound about the core in the form of a closed winding of fine wire which may be positioned in the vicinity of a record surface. Tensioning means is placed on the inner periphery of the core to hold the wire tautly in place against the outer periphery of the core.

Details of construction and operation of the invention are explained in the ensuing specification with reference to the accompanying drawing, in which.

Figures 1, 2, 3:
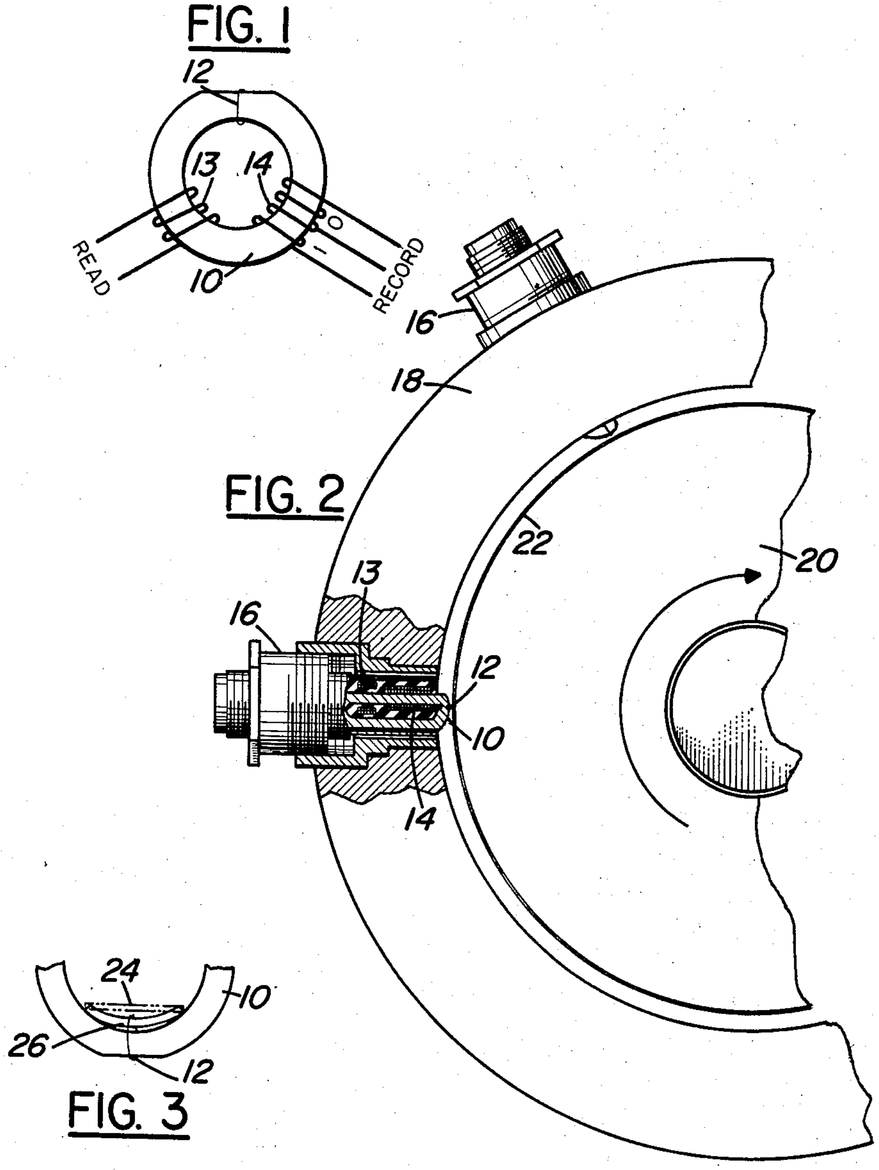
Fig. 1 is a schematic view of a transducer constructed in accordance with the principles of the invention.
Fig. 2 is a partial elevation view, broken away in section, of a magnetic drum storage system embodying the invention.
Figs. 3 and 4 are partial views of transducers incorporating further aspects of the invention.

Referring now to Figs. 1 and 2 of the drawing, a completely closed toroidal type homogeneous ferromagnetic core 10 of high magnetic permeability is shown. A single closed transducing winding comprising a shorted turn 12 of fine wire closely wound about one portion of the core 10 is provided. Auxiliary transformer windings 13 and 14 on another portion of the core are provided for connection to external electrical circuits. The ring or core 10 is mounted in a fitting 16 of the housing 18 about a rotary drum 20, or other movable member, and the ring is positioned adjacent to the surface coating 22 of ferromagnetic record material on the drum. The axis of the ring is disposed substantially parallel to the recording surface and the thin conductive band 12 of the transducer winding provides an encircling ridge in close proximity to the outer periphery of the transducing portion of core 10, which is disposed closely adjacent to the path of movement of the record surface 22. The ridge, therefore, constitutes the closest part of the core to the record surface and serves as the transducing means.

A magnetic drum storage device of this type is well adapted to store discrete digital information in a plurality of indexed tracks about the circumference of the drum. In order to provide maximum storage capacity it is desirable that the transducer record and reproduce signals of high definition so that the signal packing density is high.

With the present transducer, the fine wire transducing means 12 encircling the core 10 is particularly adapted to record a discrete digital signal in a small space and may be placed very close to the magnetic coating 22 on the drum surface. It is significant that in the core of the present transducer there is no transducing gap which might cause a concentrated residual leakage flux in the vicinity of the record surface 22. Since the core forms a closed endless loop of magnetic material unbroken throughout its extent, any external residual flux is distributed uniformly about the entire toroid.

In manufacture uniformity of the diameter of the fine wire is more easily achieved than uniformity of the width of a transducing gap in prior art heads. The transducers of this invention are therefore capable of more uniform response than prior art transducers. This is desirable in a multi-track indexed storage system since the maximum storage cell packing density is determined by the poorest head response. With more uniform construction, however, it is possible not only to define smaller storage cells but to obtain more nearly identical response from all tracks of the storage system.

Fig. 3 illustrates details of manufacturing a toroidal transducer with a thin silver or copper conductive wire. Since the closed turn must be soldered about the toroid, a problem is presented because the heat transferred from the soldering iron to the fine wire causes it to open or weaken. In addition, it is difficult to draw the wire tight enough to fit firmly about the head after soldering in a conventional manner. Only a tight fitting wire will provide properly oriented transducer flux. A tight fitting wire also will not sag so as to cause the spacing from the recording surface to change or the transducing wire to become broken by contact with the recording surface.

In construction of the head, therefore, a thin conductive or metallic flexible shim 24 is compressed against the core 10. The surface of the shim is preferably cleaned and tinned to provide a good soldering and heat conductive surface. The conductor 12 is then wound about the core and the opposite ends are held in contact with the shim for soldering thereto. During soldering, therefore, the heat is rapidly conducted away from the fine wire by the shim 24 and therefore the soldering may be accomplished without breaking or weakening the wire. After soldering the shim will flex into a semi-compressed position 26 holding the transducer wire 12 tightly in place.

Figure 4:
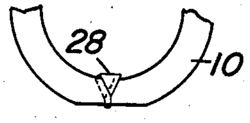

In order to provide the proper flux density and sharp definition at the record surface and yet keep the closed transducer winding losses at a minimum, the shorted turn may be shaped as shown in Fig. 4 to have a widened saddle section or band 28 about the inner toroidal core surface opposite the thinner band comprising the transducing surface. The winding may be tapered or otherwise shaped to provide optimum transducing flux pattern and the widened saddle section 28 may be used for the additional purpose of the shim 24 of Fig. 3, if desired.

From the foregoing description it is clear that there is provided in accordance with the teachings of this invention an improved magnetic transducer affording many advantages in connection with recording systems. Such transducers are particularly adapted for improving operational efficiency of indexed drum storage systems of the type described. Those novel features believed descriptive of the nature of the invention are therefore described with particularity in the appended claims.

What is claimed is:

1. In combination, a movable member having a magnetic recording surface, magnetic transducing means comprising a completely closed homogeneous ring of high magnetic permeability and having a transforming winding about a portion of the ring and a closed transducing winding about another portion of the ring, said transducing means being constituted by a single strand of fine wire extending completely around a section of the ring and arranged to project from the outer peripheral edge of the ring, tensioning means holding the strand of wire in a fixed taut position against the outer peripheral edge of the ring, and means positioning the ring adjacent to the magnetic recording surface of the member with the axis of the ring extending substantially parallel to the recording surface and with the projecting portion of the fine wire on the outer peripheral edge of the ring being disposed closely adjacent to the recording surface.

2. In combination, a movable member having a magnetic recording surface, magnetic transducing means comprising a ring type core formed of material of high magnetic permeability, said core being unbroken throughout its extent and thereby forming a closed endless loop of magnetic material, a transformer winding about a portion of the core, a thin band of electrical conductive material extending around another portion of the core and forming a projecting ridge thereon, tensioning means engaging the ring core at the inner peripheral surface to supply a retaining force tightly holding the band of conductive material in a fixed taut position against the outer peripheral surface of the core, and supporting means positioning the core adjacent to the path of movement of said member and with the ridge of electrical conductive material on the core constituting the closest part thereof to the magnetic recording surface of the member.

3. A magnetic transducing head comprising, a ring-type core of high magnetic permeability, said core being unbroken throughout its extent and thereby forming a closed endless loop of magnetic permeable material, a band of electrically conductive material encircling a portion of the core and forming a ridge contiguous to the core and projecting from the peripheral surface thereof, tensioning means holding the band of electrically conductive material in a fixed taut position against the outer peripheral surface of the core, and a transformer winding about another portion of the core.

4. A magnetic transducing device comprising in combination, a continuous closed toroidal type high permeability core, a closed transducing wire element wound about said core, a further transformer winding about said core adapted for connection to an external circuit, and spring means engaging the closed transducing wire element at the inner peripheral surface of the core to supply a retaining force tightly holding the wire element in a fixed taut position against the outer peripheral surface of the core.

5. A magnetic recording system comprising a movable member having a magnetic recording surface; transducing means including a completely colsed ring core of homogeneous, highly magnetically permeable material; a transformer winding about a portion of said core, and a transducer winding about another portion of said core; said transducer winding being constituted by a single strand of fine wire of low electrical impedance and having a portion thereof in substantial contact with and projecting in the form of a ridge from the outer peripheral edge of the core; and means positioning the core adjacent to the magnetic recording surface of the member with the axis of the core extending substantially parallel to the recording surface and with the projecting portion of the fine wire on the outer peripheral edge of the core being disposed closely adjacent to the recording surface.

6. A magnetic recording system comprising a movable member having a magnetic recording surface; magnetic transducer means including a completely closed ring core of homogeneous, highly magnetically permeable material; a transformer winding about a portion of the core and a transducer winding about another portion of the core; a portion of said transducer winding being a single strand of fine wire of low electrical impedance arranged in substantial contact with and projecting in the form of a ridge from the outer peripheral edge of the core; and supporting means positioning the core adjacent to the path of movement of said member and with the ridge of said transducer winding constituting the closest part thereof to the magnetic recording surface of the member.

7. A magnetic transducing head comprising, in combination, a completely closed ring core of highly magnetically permeable material, a transformer winding inductively coupled to said core, and a transducer winding having a single strand of fine wire of low electrical resistance also inductively coupled to said core, said strand of wire being in substantial contact with and projecting in the form of a ridge from the outer peripheral edge of the core.

References Cited in the file of this patent

UNITED STATES PATENTS

| | | |
|---|---|---|
| 2,456,767 | Camras | Dec. 21, 1948 |
| 2,540,654 | Cohen | Feb. 6, 1951 |
| 2,543,483 | Barrett | Feb. 27, 1951 |
| 2,551,198 | Barrett | May 1, 1951 |
| 2,612,681 | Camras | Oct. 7, 1952 |
| 2,658,114 | Buhrendorf | Nov. 3, 1953 |
| 2,676,392 | Buhrendorf | Apr. 27, 1954 |
| 2,677,019 | Buhrendorf | Apr. 27, 1954 |

FOREIGN PATENTS

| | | |
|---|---|---|
| 612,450 | Germany | Apr. 25, 1935 |